(12) United States Patent
Nahrwold

(10) Patent No.: US 11,661,066 B2
(45) Date of Patent: May 30, 2023

(54) SAND MODE SYSTEM AND METHOD FOR A VEHICLE

(71) Applicant: Dana Automotive Systems Group, LLC, Maumee, OH (US)

(72) Inventor: Thomas L. Nahrwold, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 508 days.

(21) Appl. No.: 16/794,647

(22) Filed: Feb. 19, 2020

(65) Prior Publication Data

US 2021/0253101 A1 Aug. 19, 2021

(51) Int. Cl.
| | |
|---|---|
| *B60W 30/00* | (2006.01) |
| *B60W 30/182* | (2020.01) |
| *B60W 30/18* | (2012.01) |
| *B60G 17/0165* | (2006.01) |
| *B60W 10/14* | (2012.01) |
| *B62D 6/00* | (2006.01) |

(52) U.S. Cl.
CPC ....... *B60W 30/182* (2013.01); *B60G 17/0165* (2013.01); *B60W 10/14* (2013.01); *B60W 30/18172* (2013.01); *B62D 6/007* (2013.01); *B60W 2540/18* (2013.01); *B60W 2710/202* (2013.01); *B60W 2710/207* (2013.01); *B60W 2720/30* (2013.01)

(58) Field of Classification Search
CPC ............... B60W 30/182; B60W 10/14; B60W 30/18172; B60W 2540/18; B60W 2710/202; B60W 2710/207; B60W 2720/30; B60G 17/0165; B62D 6/007
USPC ......................................................... 701/54
See application file for complete search history.

(56) References Cited

U.S. PATENT DOCUMENTS

| | | | | |
|---|---|---|---|---|
| 2015/0283918 | A1* | 10/2015 | Honda ................. | B60K 7/0007 903/909 |
| 2016/0318509 | A1* | 11/2016 | Rycroft ................. | B60T 8/1755 |
| 2019/0337391 | A1* | 11/2019 | Crombez .............. | B60W 30/02 |
| 2021/0276555 | A1* | 9/2021 | Ren ....................... | B60W 10/06 |

OTHER PUBLICATIONS

Engerman, E., "Electric Drive Axle System With a Self-Indexing Clutch and Method for Operation of Said Clutch," U.S. Appl. No. 16/794,703, filed Feb. 19, 2020, 51 pages.
Nahrwold, T., "Dig Mode System and Method for Vehicle," U.S. Appl. No. 16/794,618, filed Feb. 19, 2020, 36 pages.
Engerman, E. et al., "Electric Axle System With Removable Planetary Gear Assembly," U.S. Appl. No. 16/794,643, filed Feb. 19, 2020, 50 pages.

(Continued)

*Primary Examiner* — Tyler J Lee
*Assistant Examiner* — Tiffany P Ohman
(74) *Attorney, Agent, or Firm* — McCoy Russell LLP

(57) ABSTRACT

Methods and systems for operating axles of a vehicle are provided. In one example, a propulsion source of a first axle is operated in a torque control mode at a first torque and a propulsion source of a second axle is operated in a torque control mode at a second torque. Torque of the propulsion sources may be adjusted as a function of steering angle.

20 Claims, 5 Drawing Sheets

(56) References Cited

OTHER PUBLICATIONS

Engerman, E., "Electric Drive Axle System With Multi-Speed Gear Train," U.S. Appl. No. 16/794,632, filed Feb. 19, 2020, 37 pages.
Engerman, E., "Electric Drive Axle Gear Train and Method for Manufacturing Said Gear Train," U.S. Appl. No. 16/794,654, filed Feb. 19, 2020, 48 pages.
Wesolowski, S. et al., "System and Method for Charachterizing a Clutch," U.S. Appl. No. 16/794,675, filed Feb. 19, 2020, 43 pages.
Nahrwold, T. et al., "Systems and Method for Adjusting Vehicle Performance," U.S. Appl. No. 16/794,783, filed Feb. 19, 2020, 34 pages.
Engerman, E., "Vehicle System With Multiple Electric Drive Axles," U.S. Appl. No. 16/795,263, filed Feb. 19, 2020, 43 pages.
Engerman, E., "Electric Drive Axle With Lubrication System," U.S. Appl. No. 16/795,280, filed Feb. 19, 2020, 47 pages.

* cited by examiner

SAND MODE SYSTEM AND METHOD FOR A VEHICLE

TECHNICAL FIELD

The present disclosure relates to a driveline operating mode for a wheeled vehicle. The system and method may be particularly useful for off-road vehicles.

BACKGROUND AND SUMMARY

A vehicle may be driven off-road in sand from time to time. Sand may be looser than many soils and it may be difficult to maintain traction while driving in sand. A vehicle that is operating in four wheel drive (e.g., 4×4 powertrain mode) may have 50% of driveline torque delivered to a front axle while the remaining 50% is delivered to a rear axle. At times, it may be more difficult to induce side slip to the vehicle while the vehicle is operating in four wheel drive mode because of the distribution of torque to the front axle. This may limit the vehicle's "fun factor," but it may be difficult to maintain forward motion in the vehicle if the vehicle is engaged in two wheel drive (2×4 powertrain mode). Therefore, it may be desirable to provide for a vehicle that enables side slip, yet has the ability to maintain forward momentum.

The inventors herein have recognized the above-mentioned issues and have developed a method for operating a vehicle powertrain, comprising: operating a first propulsion source providing propulsive effort to a front axle in a torque control mode; operating a second propulsion source providing propulsive effort to a rear axle in a torque control mode; and increasing a proportion of a driver demand wheel torque provided via the second propulsion source from a base proportion in response to a steering angle being greater than a threshold angle.

By operating two different propulsion sources in torque control mode and increasing a proportion of driver demand wheel torque provided via a second propulsion source, it may be possible to provide the technical result of allowing a vehicle to generate side slip when desired while still retaining tractive effort to maintain the vehicle's forward momentum. In particular, a portion of a driver requested wheel torque that is delivered by a propulsion source that is coupled to a rear axle may be increased when a steering angle indicates that vehicle side slip may be desired. However, if the vehicle side slip exceeds a threshold level, the proportion or driver requested wheel torque that is delivered by the propulsion source that is coupled to the rear axle may be reduced. At the same time, a proportion of the driver requested wheel torque that is delivered by a propulsion source that is coupled to a front axle may be increased. In this way, tractive effort of the vehicle may be maintained while permitting a desired level of vehicle side slip.

The present description may provide several advantages. In particular, the approach may improve vehicle performance and traction while a vehicle is driven in sand. In addition, the approach may actively limit vehicle side slip, thereby improving vehicle stability. Further, the approach may be engaged or disengaged by simply adjusting a position of a steering wheel so that vehicle operation may be simplified.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
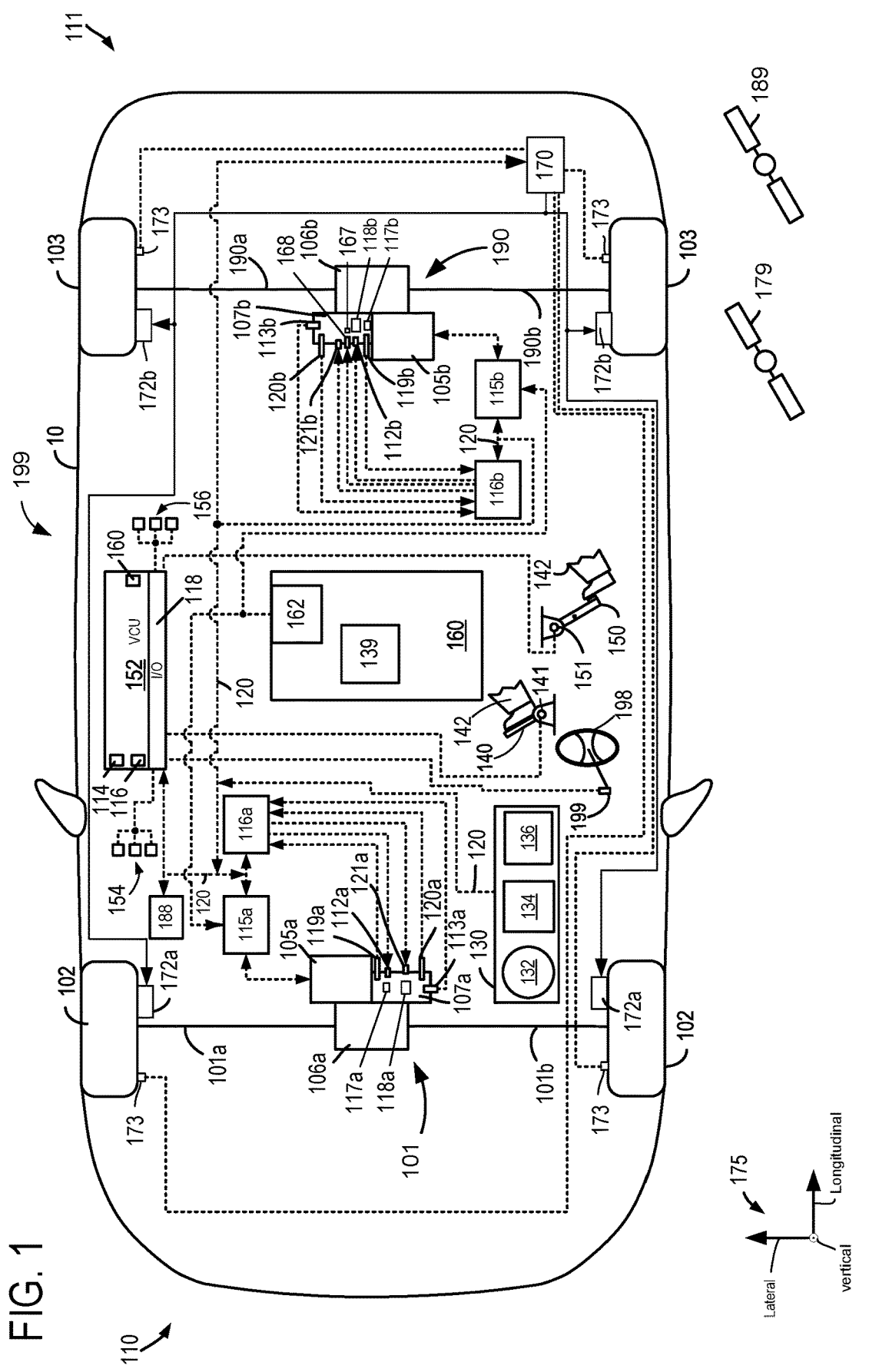
FIG. 1 is a schematic diagram of a first vehicle powertrain.
Figure 2:
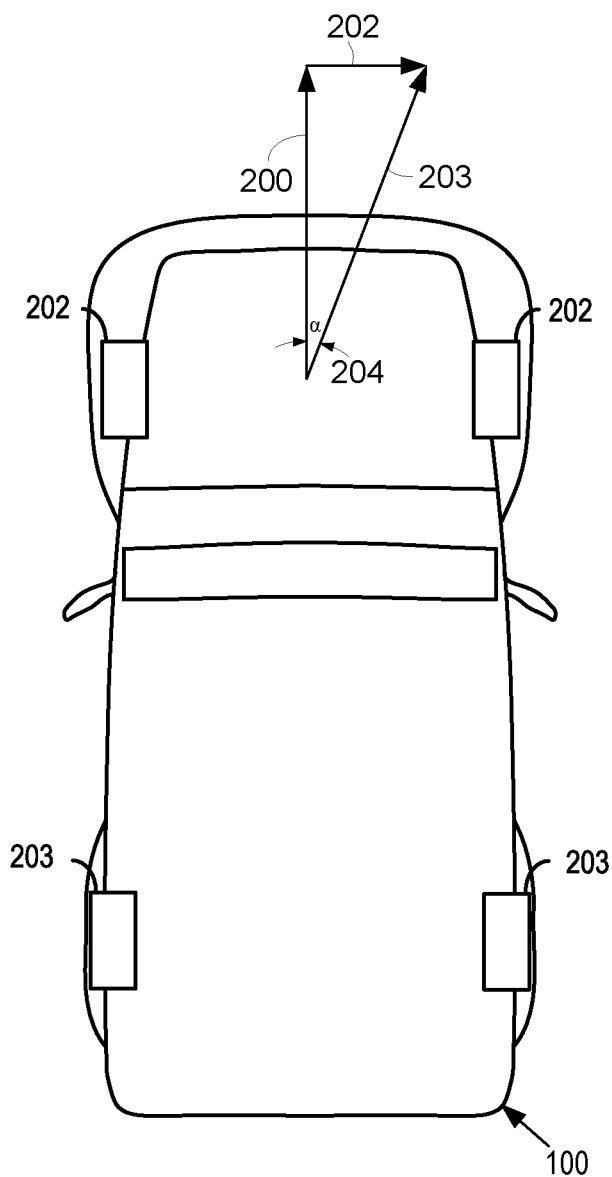
FIG. 2 shows a graphical representation of vehicle side slip angle.
Figure 3:
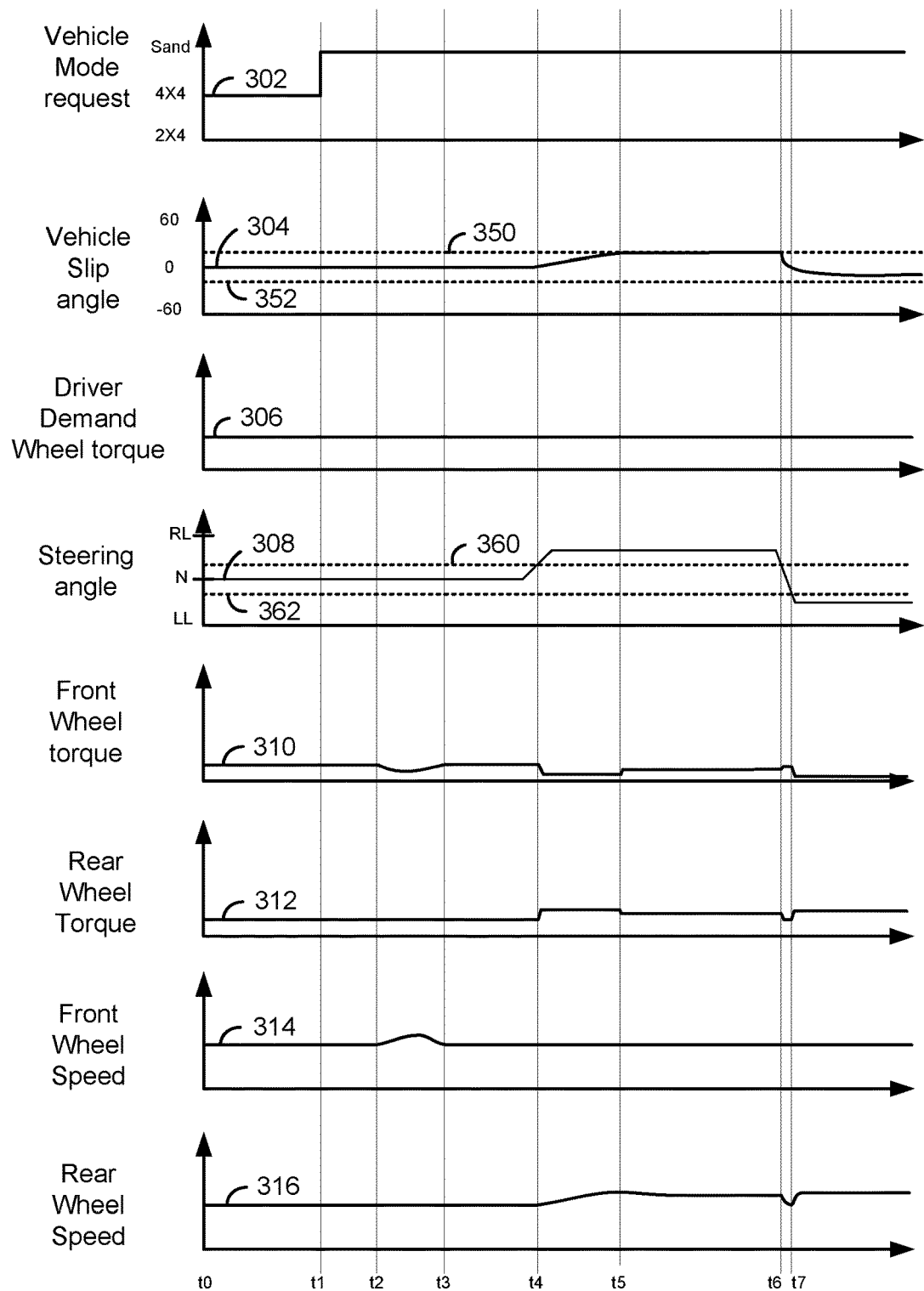
FIG. 3 shows an example powertrain operating sequence according to the method of FIG. 5.
Figure 4:
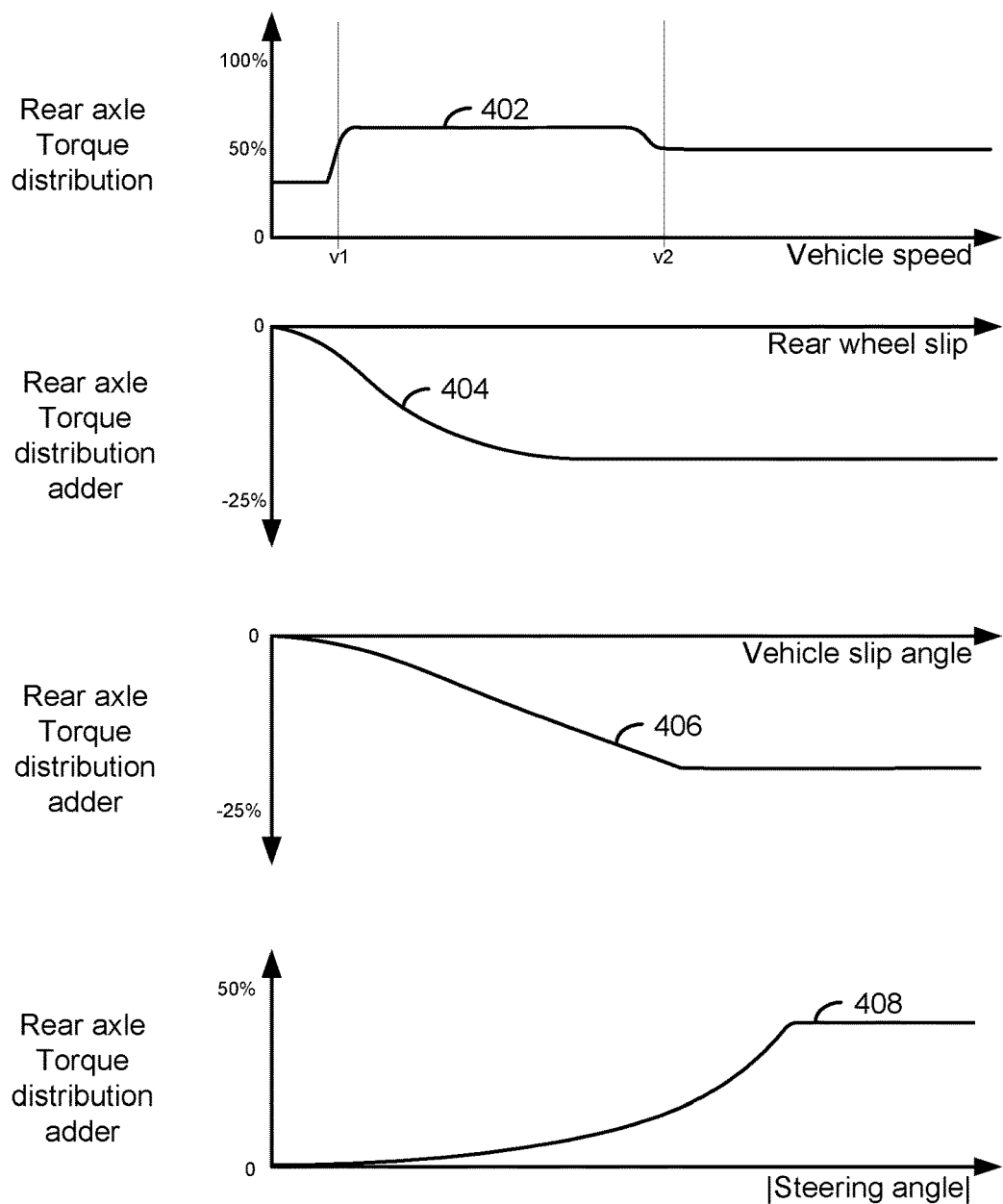
FIG. 4 shows example functions for operating a powertrain in a sand mode.

The following description relates to systems and methods for operating a powertrain of a vehicle. The powertrain may include one or more electric machines that may selectively provide power to propel the vehicle. The one or more electric machines may also selectively operate in a regeneration mode whereby the electric machines may convert mechanical energy into electrical energy. The vehicle may be operated in a sand mode where the front axle rotates to propel the vehicle and where the rear axle operates to induce vehicle side slip. FIG. 1 shows an example powertrain where a sand mode may be implemented. FIG. 2 shows a vehicle including a side slip vector. FIG. 3 shows an example powertrain operating sequence where a vehicle is operated in a sand mode. Example functions for operating a vehicle in sand mode are shown in FIG. 4. The vehicle may be operated in sand mode according to the method of FIG. 5.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes at two propulsion sources 105*a* and 105*b*. In one example, propulsion sources 105*a* and 105*b* may be electric machines that may operate as motors or generators. In another example, one of propulsion sources 105*a* and 105*b* may be an internal combustion engine and the other of propulsion sources 105*a* and 105*b* may be an electric machine. Thus, vehicle propulsion system 199 may be an electric vehicle or a hybrid vehicle. If one of propulsion sources 105*a* or 105*b* is an internal combustion engine, the internal combustion engine may consume liquid or gaseous fuel. Both or one of propulsion sources 105*a* and 105*b* may consume and/or generate electrical power depending on their operating mode. Throughout the description of FIG. 1, mechanical connections and hydraulic connections between the various components are illustrated as solid lines, whereas electrical connections between various components are illustrated as dashed lines.

Vehicle propulsion system 199 includes a front axle 101 and a rear axle 190. Rear axle 190 comprises two half shafts, including a first or right haft shaft 190a and a second or left half shaft 190b. Likewise, front axle 101 comprises a first or right half shaft 101a and a second or left half shaft 101b. Vehicle propulsion system 199 further includes front wheels 102 and rear wheels 103. Front wheels 102 may be selectively driven via propulsion source 105a and rear wheels 103 may be selectively drive via propulsion source 105b. Thus, propulsion system 199 may operate in a four wheel drive mode or a two wheel drive mode.

The rear axle 190 may be an integrated axle that includes a differential 106b, gearbox 107b, and propulsion source 105b. Alternatively, propulsion source 105b and gearbox 107b may be separate from rear axle 190. Gearbox 107b includes a first speed sensor 119b for sensing an input shaft speed, a second speed sensor 120b for sensing a transmission output shaft speed, a clutch actuator 112b, a sprag clutch lock ring actuator 121b, a sprag clutch 117b, and a clutch position sensor 113b. Gearbox 107b may include a parking pawl 167 to selectively prevent rotation of a transmission output shaft of gearbox 107b. The parking pawl may be engaged and disengaged via parking pawl actuator 168. In examples where propulsion source 105b is an electric machine, electric power inverter 115b is electrically coupled to propulsion source 105b. A transmission control unit 116b is electrically coupled to sensors and actuators of gearbox 107b.

Propulsion source 105b may transfer mechanical power to or receive mechanical power from gearbox 107b. As such, gearbox 107b may be a two speed gearbox that may shift between gears when commanded via transmission control unit 116b. Gearbox 107b may transfer mechanical power to or receive mechanical power from differential 106b. Differential 106b may transfer mechanical power to or receive mechanical power from wheels 103 via right half shaft 190a and left half shaft 190b. Propulsion source 105b may consume alternating current (AC) electrical power provided via electrical inverter 115b. Alternatively, propulsion source 105b may provide AC electrical power to electrical inverter 115b. Electrical power inverter 115b may be provided with high voltage direct current (DC) power from electrical energy storage device 160 (e.g., a traction battery or a traction capacitor). Electric power inverter 115b may convert the DC electrical power from electrical energy storage device 160 into AC electrical power for propulsion source 105b. Alternatively, electrical power inverter 115b may be provided with AC power from propulsion source 105b. Electric power inverter 115b may convert the AC electrical power from propulsion source 105b into DC power to store in electrical power storage device 160.

Energy storage device 160 may periodically receive electrical energy from a power source such as a stationary power grid (not shown) residing external to the vehicle (e.g., not part of the vehicle). As a non-limiting example, vehicle propulsion system 199 may be configured as a plug-in electric vehicle (EV), whereby electrical energy may be supplied to energy storage device 160 via the power grid (not shown).

Electric energy storage device 160 includes an electric energy storage device controller 139 and an electrical power distribution box 162. Electric energy storage device controller 139 may provide charge balancing between energy storage element (e.g., battery cells) and communication with other vehicle controllers (e.g., vehicle control unit 10). Power distribution module 139 controls flow of electrical power into and out of electric energy storage device 160.

The front axle 101 may be an integrated axle that includes a differential 106a, gearbox 107a, and propulsion source 105a. Alternatively, propulsion source 105a and gearbox 107a may be separate from front axle 101. Gearbox 107a includes a first speed sensor 119a for sensing an input shaft speed, a second speed sensor 120a for sensing a transmission output shaft speed, a clutch actuator 112a, a sprag clutch lock ring actuator 121a, sprag clutch 117a, and a plate clutch position sensor 113a. In examples where propulsion source 105a is an electric machine, electric power inverter 115a is electrically coupled to propulsion source 105a. A transmission control unit 116a is electrically coupled to sensors and actuators of gearbox 107a.

Propulsion source 105a may transfer mechanical power to or receive mechanical power from gearbox 107a. As such, gearbox 107a may be a two speed gearbox that may shift between gears when commanded via transmission control unit 116a. Gearbox 107a may transfer mechanical power to or receive mechanical power from differential 106a. Differential 106a may transfer mechanical power to or receive mechanical power from wheels 102 via right half shaft 101a and left half shaft 101b. Propulsion source 105a may consume alternating current (AC) electrical power provided via electrical inverter 115a. Alternatively, propulsion source 105a may provide AC electrical power to electrical inverter 115a. Electrical power inverter 115a may be provided with high voltage direct current (DC) power from electrical energy storage device 160 (e.g., a traction battery or a traction capacitor). Electric power inverter 115a may convert the DC electrical power from electrical energy storage device 160 into AC electrical power for propulsion source 105a. Alternatively, electrical power inverter 115a may be provided with AC power from propulsion source 105a. Electric power inverter 115a may convert the AC electrical power from propulsion source 105a into DC power to store in electrical power storage device 160.

Vehicle 10 includes a vehicle control unit (VCU) controller 152 (as also shown in FIG. 1) that may communicate with inverter 115a, inverter 115b, transmission controller 116a, transmission controller 116b, friction or foundation brake controller 170, global positioning system (GPS) 188, and dashboard 130 and components included therein via controller area network (CAN) 120. VCU 152 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156 as shown in FIG. 1. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 199, accelerator pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Accelerator pedal sensor 141 is shown coupled to accelerator pedal 140 for determining a degree of application of accelerator pedal 140 by human 142. Brake pedal sensor 151 is shown coupled to brake pedal 150 for determining a degree of application of brake pedal 150 by human 142. Steering angle sensor 199 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include an interactive weather data display and notification system 134 that may communicate weather forecast data to VCU 152. Weather data display and notification system 134 may receive weather data and forecasts at the vehicle's present location from communications satellite 179. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to initiate and/or terminate operation of the vehicle driveline (e.g., electric machine 105a and electric machine 105b) based on an operator input. Various examples of the operator interface 136 may include interfaces that require a physical apparatus, such as an active key, that may be inserted into the operator interface 136 to activate the electric machines 105a and 105b and to turn on the vehicle 10, or may be removed to shut down the electric machines 105a and 105b to turn off the vehicle. Other examples may include a passive key that is communicatively coupled to the operator interface 136. The passive key may be configured as an electronic key fob or a smart key that does not have to be inserted or removed from the interface 136 to operate the vehicle electric machines 105a and 105b. Rather, the passive key may need to be located inside or proximate to the vehicle (e.g., within a threshold distance of the vehicle). Still other examples may additionally or optionally use a start/stop button that is manually pressed by the operator to start or shut down the electric machines 105a and 105b to turn the vehicle on or off. In other examples, a remote electric machine start may be initiated remote computing device (not shown), for example a cellular telephone, or smartphone-based system where a user's cellular telephone sends data to a server and the server communicates with the vehicle controller 152 to activate an inverter and electric machine. Spatial orientation of vehicle 10 is indicated via axes 175.

Vehicle 10 is also shown with a foundation or friction brake controller 170. Brake controller 170 may selectively apply and release friction brakes 172 via allowing hydraulic fluid to flow to friction brakes 172. Front friction brakes 172a and rear friction brakes 172b may be applied and released so as to avoid locking of friction brakes 172a to wheels 102 and brakes 172b to wheels 103. Wheel position or speed sensors 173 may provide wheel speed data to brake controller 170.

Vehicle propulsion system 199 may provide torque to wheels 102 and 103 to propel vehicle 10. Vehicle propulsion system 199 may operate in a two wheel drive mode where propulsion source 105a or propulsion source 105b is activated and where the other of propulsion source 105a or propulsion source 105b is not activated. Alternatively, vehicle propulsion system may operate in a four wheel drive mode where both electric machines 105a and 105b are activated.

A human or autonomous driver may request a driver demand wheel torque, or alternatively a driver demand wheel power, via applying accelerator pedal 140 or via supplying a driver demand wheel torque/power request to vehicle controller 10. Vehicle controller 152 may then allocate a fraction of the driver demand wheel torque/power to be provided by propulsion source 105a and the remaining amount of driver demand wheel torque/power to be provided via propulsion source 105b when vehicle 10 is operating in a four wheel drive mode. Thus, vehicle controller 152 may determine a torque/power distribution between front axle 101 and rear axle 190. In one example, a baseline torque/power distribution may be 50:50 or 50% of the requested wheel torque/power is to be generated via the front axle 101 and 50% of the requested wheel torque/power is to be generated via the rear axle 190 when vehicle propulsion system 199 is being operated in a four wheel drive mode.

Once vehicle controller 152 determines the torque/power distribution between the front axle 101 and the rear axle 190, vehicle controller 152 may command inverter 115a to deliver the portion of the driver demand wheel torque/power allocated to front axle 101 and may command inverter 115b to deliver the portion of the driver demand wheel torque/power allocated to rear axle 190. Inverters 115a and 115b may convert DC electrical power from electrical energy storage device 160 into AC power and supply the AC power to propulsion source 105a and propulsion source 105b. Propulsion source 105a rotates and transfers torque/power to gearbox 107a. Gearbox 107a may supply torque from propulsion source 105a to differential 106a, and differential 106a transfers torque from propulsion source 105a to wheels 102 via half shafts 101a and 101b. Similarly, propulsion source 105b rotates and transfers torque/power to gearbox 107b. Gearbox 107b may supply torque/power from propulsion source 105b to differential 106b, and differential 106b transfers torque/power from propulsion source 105b to wheels 103 via half shafts 190a and 190b.

During conditions when the accelerator pedal is fully released, vehicle controller 152 may request a small negative or regenerative braking power to gradually slow vehicle 10 when a speed of vehicle 10 is greater than a threshold speed. This regenerative braking power may mimic engine braking of vehicles having an internal combustion engine during vehicle coasting conditions. Vehicle controller 152 may determine a regenerative braking power distribution between front axle 101 and rear axle 190. The amount of regenerative braking power requested may be a function of accelerator pedal position, electric energy storage device state of charge (SOC), vehicle speed, and other conditions. If the accelerator pedal is fully released and vehicle speed is less than a threshold speed, vehicle controller 152 may request a small amount of positive torque/power from propulsion source 105a and/or 105b, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle controller 10. Vehicle controller 152 may then allocate a fraction of the driver demand braking power to be provided by propulsion source 105a and another amount of driver demand braking power to be provided via propulsion source 105b when vehicle 10 is operating in a four wheel drive mode. Additionally, vehicle controller 152 may request that a portion of the driver demanded braking power be provided via friction brakes 172 via commanding brake controller 170 to provide the requested portion of the driver requested braking power. In one example, a baseline braking power distribution may be 65:35 or 65% of the requested braking power is to be generated via the front axle 101 and 35% of the requested braking power is to be generated via the rear axle 190.

After vehicle controller 152 determines the braking power distribution between the front axle 101 and the rear axle 190, vehicle controller 152 may command inverter 115a and/or front friction brakes 172a to deliver the portion of the driver braking power allocated to front axle 101. Vehicle controller 152 may command inverter 115b and/or rear friction brakes 172b to deliver the portion of the driver demand braking power allocated to rear axle 190. Inverters 115a and 115b may convert AC electrical power generated by propulsion sources 105a and 105b converting the vehicle's kinetic energy into DC power for storage in electrical energy device 160.

Transmission control units 116a and 116b include predetermined transmission gear shift schedules whereby second gears of gearboxes 107a and 107b may be selectively engaged and disengaged. Shift schedules stored in transmission control units 116a and 116b may select gear shift points or conditions as a function of driver demand wheel torque and vehicle speed. Transmission control units 116a and 116b may selectively open and close wet or dry plate clutches 118a and 118b to engage and disengage second gear in the respective gearboxes via clutch actuators 112a and 112b.

The system of FIG. 1 also provides for a vehicle system, comprising: a first electric machine coupled to a wheel of a first axle; a second electric machine coupled to a wheel of a second axle, the second electric machine decoupled from the first electric machine; and a controller including executable instructions that cause the controller to increase torque provided to the wheel of the second axle to induce slip of the wheel of the second axle while providing a driver demand wheel torque via the first electric machine and the second electric machine in response to a request to enter a powertrain sand mode. The vehicle system further comprises additional instructions to increase torque supplied to the wheel of the first axle in response to decreasing vehicle speed. The vehicle system further comprises additional instructions to increase torque supplied to the wheel of the second axle in response to increasing vehicle speed. The vehicle system includes where the first axle is a front axle, and where the second axle is a rear axle. The vehicle system further comprises increasing torque provided to the wheel of the second axle to induce slip of the wheel of the second axle while providing the driver demand wheel torque via the first electric machine and the second electric machine in response to a steering angle greater than a threshold angle. The vehicle system further comprises additional instructions to equalize a speed of the wheel of the second axle and a speed of the wheel of the first axle in response to a steering angle being less than a threshold angle.

Referring now to FIG. 2, a figure illustrating vehicle lateral slip angle α is shown. Vehicle 10 is shown with a forward velocity vector 200 that shows the direction that vehicle 10 is pointing. Vehicle 10 is also shown with a lateral velocity vector 202. The vehicle slip angle is the angle 204 between the vehicle's actual direction 203 (e.g., the sum of the forward velocity vector 200 and the lateral velocity vector 202) and the direction that the vehicle is pointing (e.g., the same direction as the forward velocity vector 200). The forward velocity vector 200 and the lateral velocity vector 202 may be determined via accelerometers. The angle 204 may be determined from the $\tan^{-1}$ of the forward velocity vector 200 and the lateral velocity vector 202.

Figure 5:
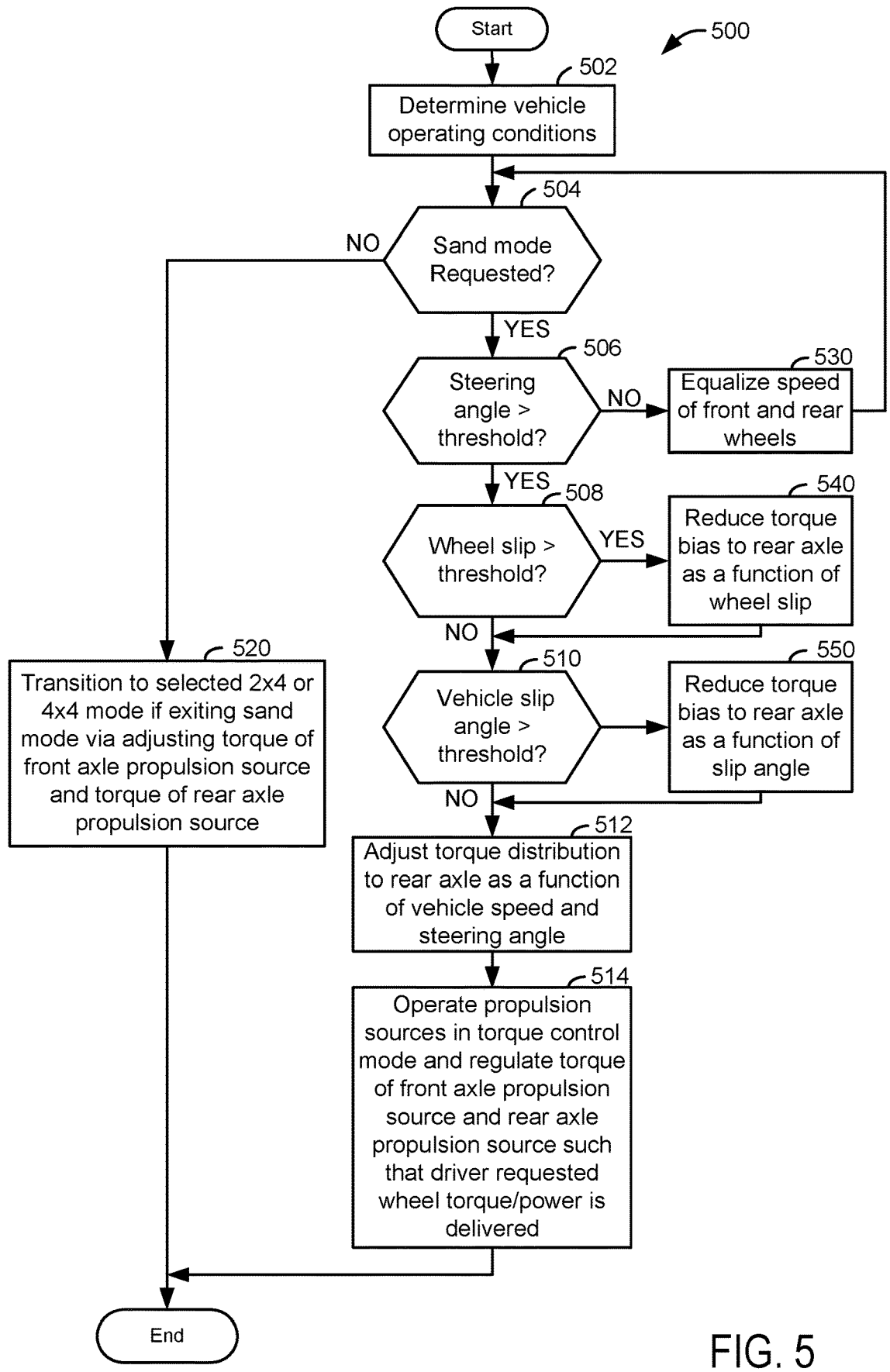
FIG. 5 shows an example method for operating a vehicle's powertrain in a sand mode.

Referring now to FIG. 3, a prophetic powertrain operating sequence according to the method of FIG. 5 is shown. The operating sequence shown in FIG. 3 may be provided via the method of FIG. 3 in cooperation with the system shown in FIG. 1. The plots shown in FIG. 3 occur at the same time and are aligned in time. The vertical lines at t0-t7 represent times of interest during the sequence.

The first plot from the top of FIG. 3 is a plot of a powertrain mode request state versus time. The vertical axis represents the powertrain mode request state and the powertrain is requested to be in a two wheel drive mode when trace 302 is at the vertical axis level indicated as 2×4. The powertrain is requested to be in a four wheel drive mode when trace 302 is at the vertical axis level indicated as 4×4. The powertrain is requested to be in a sand mode when trace 302 is at the vertical axis level indicated as sand. The horizontal axis represents time and time increases from the left side of the figure to the right side of the figure. Trace 302 represents the powertrain mode request state.

The second plot from the top of FIG. 3 is a plot of a vehicle slip angle versus time. The vertical axis represents the vehicle slip angle and the vehicle slip angle is zero when trace 304 is at the vertical axis level indicated as zero. The vehicle slip angle is positive and non-zero when trace 304 is above the zero value. The vehicle slip angle is negative and non-zero when trace 304 is below the zero value. The horizontal axis represents time and time increases from the left side of the figure to the right side of the figure. Trace 304 represents the vehicle slip angle.

The third plot from the top of FIG. 3 is a plot of driver demand wheel torque versus time. The vertical axis represents driver demand wheel torque and the driver demand wheel torque increases in the direction of the vertical axis arrow. The horizontal axis represents time and time increases from the left side of the figure to the right side of the figure. Trace 306 represents the driver demand wheel torque.

The fourth plot from the top of FIG. 3 is a plot of steering angle versus time. The vertical axis represents steering angle and steering angle is zero or neutral when trace 308 is at the vertical axis level of N. The neutral position is the steering position where both front wheels are directed straight ahead such that the vehicle will travel in a straight direction and not turn. The right wheel lock position is indicated along the vertical axis as RL. The steering wheel is rotated as far right as possible when trace 308 is at the RL position. The left wheel lock position is indicated along the vertical axis as LL. The steering wheel is rotated as far left as possible when trace 308 is at the LL position. Horizontal line 360 represents a steering angle that when exceeded may cause the vehicle to increase the wheel torque distribution to the rear wheels. In other words, if trace 308 is between horizontal line 360 and RL, then the powertrain may increase torque distribution to the rear axle to induce vehicle side slip. Horizontal line 362 represents a steering angle that when exceeded may cause the vehicle to increase wheel torque distribution to the rear wheels. In other words, if trace 308 is between horizontal line 362 and LL, then the powertrain may increase torque distribution to the rear axle to induce vehicle side slip. Trace 308 represents the steering angle.

The fifth plot from the top of FIG. 3 is a plot of front wheel torque versus time. The vertical axis represents front wheel torque and the front wheel torque increases in the direction of the vertical axis arrow. The horizontal axis represents time and time increases from the left side of the figure to the right side of the figure. Trace 310 represents the front wheel torque.

The sixth plot from the top of FIG. 3 is a plot of rear wheel torque versus time. The vertical axis represents rear wheel torque and the rear wheel torque increases in the direction of the vertical axis arrow. The horizontal axis represents time and time increases from the left side of the figure to the right side of the figure. Trace 312 represents the rear wheel torque.

The seventh plot from the top of FIG. 3 is a plot of front wheel speed versus time. The vertical axis represents front wheel speed and the front wheel speed increases in the direction of the vertical axis arrow. The horizontal axis represents time and time increases from the left side of the figure to the right side of the figure. Trace 314 represents the front wheel speed.

The eighth plot from the top of FIG. 3 is a plot of rear wheel speed versus time. The vertical axis represents rear wheel speed and the rear wheel speed increases in the direction of the vertical axis arrow. The horizontal axis represents time and time increases from the left side of the figure to the right side of the figure. Trace 316 represents the rear wheel speed.

At time to, four wheel drive mode is requested and the powertrain is in four wheel drive mode. The driver demand torque is at a middle level and the steering angle is at the neutral position. The front wheel torque and the rear wheel torque are equal and they sum to the driver demand torque. The vehicle slip angle is zero and the front and rear wheel speeds are at a middle level.

At time t1, the vehicle's driver (not shown) requests sand mode. The vehicle slip angle remains at zero and the driver demand torque is unchanged. The steering angle is zero and the front and rear wheel torque values are unchanged. The front and rear wheel speeds are also unchanged.

At time t2, the front wheel speed begins to increase while the rear wheel speed is unchanged. Such conditions may be present when the coefficient of friction between the front wheels and the driving surface is reduced. The vehicle is engaged in sand mode and the vehicle slip angle is zero. The driver demand torque is unchanged and the front and rear wheel torques are unchanged.

Between time t2 and time t3, the vehicle controller reduces the front wheel torque so that the front wheel speed is adjusted back to the speed of the rear wheels. The rear wheel torque remains at its previous level and the rear wheel speed remains at its previous speed. The vehicle remains in sand mode and the vehicle's slip angle remains at zero. The driver demand torque is unchanged and the steering angle remains at zero.

At time t3, front wheel speed is equal to the rear wheel speed and the sum of the front wheel torque and the rear wheel torque is equal to the driver demand wheel torque. The vehicle remains in sand mode and the vehicle side slip angle remains zero. The vehicle steering angle is also zero.

Between time t3 and time t4, the vehicle's driver (not shown) turns the steering wheel to the right. The vehicle remains in sand mode and the vehicle slip angle is zero. The driver demand wheel torque is unchanged and the torques of the front and rear wheels are unchanged. The speeds of the front and rear wheels remain equal and unchanged.

At time t4, the vehicle's driver (not shown) has turned the steering wheel to the right far enough that the steering angle is beyond threshold 350, which provides an indication that the vehicle's driver wishes to induce vehicle side slip. Therefore, the torque distribution between the front axle and the rear axle is adjusted to increase driver demand wheel torque that is allocated to the rear axle. In this example, the torque distribution is adjusted to 20:80, or 20% of the requested driver demand wheel torque is commanded to or requested of the front axle and 80% of the requested driver demand wheel torque is commanded to or requested of the rear axle. Biasing the torque distribution to the rear axle in this way may induce vehicle side slip and rear wheel speed may increase. However, since side slip is purposefully induced, the front wheel speed and the rear wheel speeds are allowed to diverge from each other. The vehicle side slip amount begins to increase.

Between time t4 and time t5, the vehicle's side slip amount continues to increase and the front and rear wheel torque distribution is maintained. The driver demand wheel torque is unchanged and the vehicle remains in sand mode. The steering angle remains above threshold 3660 and the rear wheel speed remains greater than the front wheel speed.

At time t5, the vehicle slip angle reaches threshold 350 so the torque distribution between the front axle and the rear axle is adjusted to prevent further vehicle side slip. In this example, the torque distribution is adjusted to 30:70, which allows the vehicle side slip angle to be maintained. The vehicle remains in sand mode and the driver demand torque is unchanged. The rear wheel speed remains greater that the front wheel speed. The steering angle remains above threshold 350.

Just before time t6, the driver begins to turn the steering wheel to the left. At time t6, the steering wheel position is below threshold 360 to the front to rear wheel torque distribution is adjusted back to 50:50. The front wheel torque is adjusted to be equal to the rear wheel torque and the sum of the rear wheel torque and the front wheel torque is equal to the driver demand wheel torque. The vehicle slip angle begins to decrease and the vehicle remains in sand mode.

At time t7, the driver has turned the steering wheel far enough to the left so that vehicle side slip is again induced. The rear wheel torque is increased and the front wheel torque is decreased. The vehicle slip angle move to a negative value and the vehicle remains in sand mode. The driver demand wheel torque is unchanged.

In this way, a driver may engage sand mode and induce vehicle side slip via adjusting a steering angle. Further, the amount of vehicle side slip may be automatically controlled such that the vehicle side slip angle does not exceed a threshold level via adjusting a torque distribution between a front axle and a rear axle. If the vehicle steering angle is less than a threshold, the wheel speeds of the front wheels and rear wheels may be controlled to be equal so that traction may be improved.

Referring now to FIG. 4, several relationships for operating a vehicle in sand mode are shown. The relationships shown in FIG. 4 are for illustration purposes only and are not meant to be limiting.

The first plot from the top of FIG. 4 shows an example relationship between vehicle speed and a rear axle torque/power distribution value. The vertical axis represents the rear axle torque/power distribution level and the rear axle torque/power distribution level may be between a value of 0 and 1. The horizontal axis represents vehicle speed and vehicle speed increases in the direction of the horizontal arrow. Curve 402 represents a relationship between vehicle speed and a rear axle torque/power distribution value. Curve 402 is less than 0.5 at low vehicle speeds (e.g., vehicle speeds less than v1) so that additional torque is supplied to the front axle, thereby improving the tractive effort at low vehicle speeds. At middle vehicle speeds (e.g., speeds between v1 and v2), the curve 402 takes on a value of 0.6 to increase the possibility of vehicle side slip (e.g., desired while traveling on sand). At higher vehicle speeds, the curve 402 returns to a value of 0.5 to equalize torque distribution between the front axle and the rear axle.

The second plot from the top of FIG. 4 shows an example relationship between rear wheel slip and a rear axle torque/power distribution value. The vertical axis represents the rear axle torque/power distribution level and the rear axle torque/power distribution level may be between a value of 0 and −0.25. The horizontal axis represents rear wheel slip and rear wheel slip increases in the direction of the horizontal arrow. Curve 404 represents a relationship between rear wheel slip and a rear axle torque/power distribution value. Curve 404 is zero at low rear wheel slip values so that the rear axle torque distribution is not modified. However, as wheel slip increases, the rear axle torque distribution value decreases so that torque that is supplied to the front axle is increased. Increasing torque to the front axle may allow the vehicle to meet the driver demand wheel torque/power and regain traction at the rear wheels.

The third plot from the top of FIG. 4 shows an example relationship between vehicle slip angle and a rear axle torque/power distribution value. The vertical axis represents the rear axle torque/power distribution level and the rear axle torque/power distribution level may be between a value of 0 and −0.25. The horizontal axis represents vehicle slip angle value and vehicle slip angle value increases in the direction of the horizontal arrow. Curve 406 represents a relationship between vehicle slip angle and a rear axle torque/power distribution value. Curve 406 is zero at low vehicle slip angle values so that the rear axle torque distribution is not modified. However, as the vehicle slip angle increases, the rear axle torque distribution value decreases so that torque that is supplied to the front axle is increased. Increasing torque to the front axle may allow the vehicle to meet the driver demand wheel torque/power and avoid higher vehicle slip angles.

The fourth plot from the top of FIG. 4 shows an example relationship between vehicle steering angle absolute value and a rear axle torque/power distribution value. The vertical axis represents the rear axle torque/power distribution level and the rear axle torque/power distribution level may be between a value of 0 and 0.5. The horizontal axis represents vehicle steering angle absolute value and the vehicle steering angle absolute value increases in the direction of the horizontal arrow. Curve 408 represents a relationship between vehicle steering angle absolute value and a rear axle torque/power distribution value. Curve 408 is zero at low vehicle steering angle values so that the rear axle torque distribution is not modified. However, as the vehicle steering angle value increases, the rear axle torque distribution value increases so that torque that is supplied to the front axle is decreased. Decreasing torque to the front axle may allow the vehicle to induce vehicle side slip when turning, thereby increasing the "fun factor" when driving the vehicle in sand.

The plots of FIG. 4 illustrate several relationships to convey concepts described herein. However, the relationships shown in FIG. 4 are exemplary in nature and are not to be taken as limiting. Actual relationships may be different than those shown in FIG. 4 to improve vehicle drivability and to compensate for vehicle dynamics.

Referring now to FIG. 5, an example method for operating a powertrain in a sand mode is shown. The method of FIG. 5 may be incorporated into and may cooperate with the system of FIG. 1. Further, at least portions of the method of FIG. 5 may be incorporated as executable instructions stored in non-transitory memory while other portions of the method may be performed via a controller transforming operating states of devices and actuators in the physical world. The term torque/power is used in this description to indicate that the parameter may be described or requested in terms of torque or power. For example, an accelerator pedal position may be converted into a wheel torque demand or into a wheel power demand.

At 502, method 500 determines vehicle operating conditions. Vehicle operating conditions may include but are not limited to requests for sand mode, steering angle, vehicle speed, and presently engaged powertrain mode. Method 500 may determine the vehicle operating conditions via the sensors and controllers described herein. Method 500 proceeds to 504.

At 504, method 500 judges if sand mode is requested. A request for sand mode may be made via a human/machine, or an operator interface, or via an autonomous driver requesting sand mode via an input to vehicle controller 10. If method 500 judges that sand mode is requested, the answer is yes and method 500 proceeds to 506. Otherwise, the answer is no and method 500 proceeds to 520.

At 520, method 500 transitions to a two wheel drive or a four wheel drive powertrain mode if the vehicle is presently engaged in sand mode. If the powertrain is not engaged in sand mode, then the powertrain remains in its presently selected mode. The powertrain mode may be requested via the human/machine interface or via the operator interface. If the powertrain is presently engine in sand mode and the powertrain was engaged in four wheel drive mode immediately prior to entering sand mode, the powertrain reverts back to four wheel drive mode. If the powertrain is presently engine in sand mode and the powertrain was engaged in two wheel drive mode immediately prior to entering sand mode, the powertrain reverts back to two wheel drive mode.

The powertrain may be transitioned to four wheel drive mode from sand mode via reverting to a base axle torque/power distribution. The transition may begin by determining the present wheel torque/power request and the base torque/power distribution between the front and the rear axle. The present wheel torque/power request may be determined from accelerator pedal position and vehicle speed. In particular, as described in greater detail below, accelerator pedal and vehicle speed may be inputs into a table or function that returns a requested or demanded wheel torque/power. The torque/power distribution between the front and the rear axle may be a base distribution (e.g., 50:50) that is retrieved via controller ROM. The requested rear wheel torque/power may be determined by multiplying the driver requested wheel torque/power by the distribution percentage allocated to the rear axle. For example, if the driver demand wheel torque is 600 Newton-meters (Nm) and the torque distribution to the rear axle is 50%, then the rear wheel torque request is 600 Nm·0.5=300 Nm. The requested front wheel torque/power may be determined in a similar way. The present torque output of the rear axle propulsion source from operating the rear axle propulsion source in torque control mode may then be changed at a predetermined rate or ramped until the rear axle wheel torque is equal to the presently requested wheel torque that is allocated to the rear axle. Similarly, the present torque output of the front axle propulsion source from operating the front axle propulsion source in torque control mode may then be changed at a predetermined rate or ramped until the front axle wheel torque is equal to the presently requested wheel torque that is allocated to the front axle. The front wheel torque and the rear wheel torque are commanded to sum to the driver demand wheel torque.

The powertrain may be transitioned to rear drive two wheel drive mode from sand mode by transferring torque from the front axle to the rear axle. The transition may begin by determining the present wheel torque request. The present torque output of the rear axle propulsion source from operating the rear axle propulsion source in torque control mode may then be changed at a predetermined rate or ramped until the rear axle wheel torque is equal to the presently requested wheel torque. The front axle torque is adjusted from a positive torque to zero torque. The rear wheel torque is commanded to follow the driver demand wheel torque.

At 506, method 500 judges if the present vehicle steering angle is greater than a threshold angle (e.g., 20 degrees). If the present vehicle steering angle is greater than the threshold angle, the answer is yes and method 500 proceeds to 508. Otherwise, the answer is no and method 500 proceeds to 530.

At 530, method 500 equalizes the speed of the front wheels with the speed of the rear wheels or vice-versa. In particular, if slip of one of the front wheels is detected, the fraction of driver demand wheel torque/power that is distributed to the front wheels is decreased and the fraction of driver demand wheel torque/power that is distributed to the rear wheels is increased to a fraction where the front wheels no longer slip or where both front and rear wheels slip. Conversely, if slip of one of the rear wheels is detected, the fraction of driver demand wheel torque that is distributed to the rear wheels is decreased and the fraction of driver demand wheel torque/power that is distributed to the front wheels is increased to a fraction where the rear wheels no longer slip or where both the front and rear wheels slip. Wheel slip occurs when there is motion of a wheel or tire relative to a surface that the wheel or tire is traveling upon. Wheel or tire slip may be generated when a rotational speed of a wheel or tire is greater or less than a free rolling speed of the wheel or tire. The free rolling speed of the wheel or tire is the speed that the wheel or tire rotates relative to the road surface when torque is not applied to the wheel. The propulsion sources of front and rear axles may operate in a torque control mode while speed of the front wheels is adjusted to the speed of the rear wheels or vice-versa. If there is no wheel slip, method 500 may adjust the torque/power distribution between the front axle and the rear axle to a 50:50 torque/power distribution. The relationship between torque/power distribution to the front axle and torque/power distribution to the rear axle may be described by the following equation:

FWD=1−RWD where FWD is the front wheel torque/power distribution and RWD is the rear wheel torque/power distribution. The rear wheel torque/power distribution may a real number in a range from zero to one. The rear wheel torque/power demand may be expressed as: Tw_rear=Tdd·RWD. The front wheel torque/power demand may be expressed as: Tw_front=Tdd·FWD or Tw_front=Tdd·1−RWD. Method 500 returns to 504.

At 508, method 500 judges if the present rear wheel slip is greater than a threshold wheel slip amount. If so, the answer is yes and method 500 proceeds to 540. Otherwise, the answer is no and method 500 proceeds to 510. In one example, method 500 may determine a rear wheel slip amount via measuring the speed of the rear wheel and comparing the speed of the rear wheel to vehicle speed, or alternatively, a speed of a different wheel. If method 500 judges that speed of the rear wheel is a threshold amount greater or less than expected speed of the rear wheel at the present vehicle speed, then method 500 may judge that wheel slip is present. The wheel slip amount may be determined as a present speed of the wheel minus an expected speed of the wheel that is based on vehicle speed. If the rear wheel slip amount is greater than the threshold rear slip amount, method 500 proceeds to 540.

At 540, method 500 adjusts the distribution of torque/power to the rear axle as a function of the amount of wheel slip that is detected at the rear wheels. In one example, the distribution of torque/power to the rear wheel is reduced according to a relationship as shown in the second plot from the top of FIG. 4. For example, for smaller rear wheel slip amounts, very little of the driver demand wheel torque/power that is being allocated to the rear wheels is reduced. However, as the rear wheel slip amount increases, the portion of driver demand wheel torque/power that is being allocated or requested at the rear wheels is increased. Method 500 proceeds to 510.

At 510, method 500 judges if the present vehicle slip angle is greater than a threshold vehicle slip angle amount. If so, the answer is yes and method 500 proceeds to 550. Otherwise, the answer is no and method 500 proceeds to 512. In one example, method 500 may determine a vehicle slip amount via vehicle accelerometers as previously discussed. If the vehicle slip angle is greater than the threshold vehicle slip angle, method 500 proceeds to 550.

At 550, method 500 adjusts the distribution of torque/power to the rear axle as a function of the amount of vehicle slip angle. In one example, the distribution of torque/power to the rear wheel is reduced according to a relationship as shown in the third plot from the top of FIG. 4. For example, for smaller vehicle slip angles, very little of the driver demand wheel torque/power that is being allocated to the rear wheels is reduced. However, as the vehicle slip angle increases, the portion of driver demand wheel torque that is being allocated or requested at the rear wheels is increased. Method 500 proceeds to 512.

At 512, method 500 adjusts the distribution of torque/power to the rear axle as a function of the vehicle's present speed and the present steering angle. In one example, the distribution of torque/power to the rear wheel is reduced according to a relationship as shown in the first and fourth plots from the top of FIG. 4. For example, at lower vehicle speeds and small steering angles, the torque/power distribution to the rear wheels is 40% so that tractive effort may be maintained at lower vehicle speeds. At medium vehicle speeds, the torque/power distribution to the rear wheels may increase to 60%. At higher vehicle speeds, the torque/power distribution to the rear wheels may be adjusted to 50%. At lower steering angles, the torque/power distribution to the rear wheels may not be adjusted. However, as the absolute value of the steering angle increases, the torque/power distribution to the rear axle increases. The torque/power distribution to the rear axle may be described by the following equation:

$$RWD = f1(Vs) + f2(\alpha) + f3(RWs) + f4(Vslip)$$

where RWD is the rear wheel torque/power distribution (e.g., a value between 0 and 1), f1 is a function that returns a portion of the rear wheel torque/power distribution based on vehicle speed, Vs is vehicle speed, f2 is a function that returns a portion of the rear wheel torque/power distribution based on steering angle, a is the vehicle steering angle, f3 is a function that returns a reduction of the rear wheel torque/power distribution that is based on rear wheel slip, RWs is rear wheel slip, f4 is a function that returns a reduction of the rear wheel torque/power distribution that is based on vehicle side slip, and Vslip is the vehicle side slip angle. It should be noted that the front wheel torque/power distribution is related to the rear wheel torque distribution by the equation: FWD=1−RWD. Method 500 proceeds to 514 after front and rear wheel torque distribution is determined.

At 514, method 500 delivers the requested driver demand wheel torque/power via the front and rear propulsion sources. In particular, the front propulsion source is commanded to provide a front axle requested wheel torque: Tw_front=Tdd·FWD or Tw_front=Tdd·1−RWD. The rear propulsion source is commanded to provide a rear axle requested wheel torque: Tw_rear=Tdd·RWD. Thus, the sum of the requested rear wheel torque and the requested front wheel torque is equal to the driver demand wheel torque. Method 500 proceeds to exit.

In this way, torque distribution between a front axle and a rear axle may be adjusted to provide a vehicle side slip angle while a vehicle is operated in a sand mode. The torque distribution may be altered as a function of vehicle speed, vehicle side slip angle, steering angle, and wheel slip.

Thus, the method of FIG. 5 provides for a method for operating a vehicle powertrain, comprising: operating a first propulsion source providing propulsive effort to a front axle in a torque control mode; operating a second propulsion source providing propulsive effort to a rear axle in a torque control mode; and increasing a proportion of a driver demand wheel torque provided via the second propulsion source from a base proportion in response to a steering angle being greater than a threshold angle. The method further comprises decreasing the proportion of the driver demand wheel torque provided via the second propulsion source in response to the steering angle being less than the threshold angle. The method further comprises adjusting the proportion of the driver demand wheel torque provided via the second propulsion source as a function of the steering angle. The method includes where adjusting the proportion of the driver demand wheel torque provided via the second propulsion source as the function of the steering angle includes increasing the proportion of the driver demand wheel torque provided to the second propulsion source as an exponential function of the steering angle.

In some examples, the method includes where adjusting the proportion of the driver demand wheel torque provided via the second propulsion source as the function of the steering angle includes increasing the proportion of the driver demand wheel torque provided to the second propulsion source as a linear function of the steering angle. The method includes where the first propulsion source and the second propulsion source are electric machines. The method includes where the first propulsion source or the second propulsion source is an electric machine, and where the other of the first propulsion source or the second propulsion source is an internal combustion engine.

The method of FIG. 5 also provides for a method for operating a vehicle powertrain, comprising: operating a first propulsion source providing propulsive effort to a front axle in a torque control mode; operating a second propulsion source providing propulsive effort to a rear axle in a torque control mode; increasing a proportion of a driver demand wheel torque provided via the second propulsion source from a base proportion in response to a request to enter a sand powertrain mode; and decreasing the proportion of the driver demand wheel torque provided via the second propulsion source in response to a vehicle slip angle exceeding a threshold angle. The method further comprises adjusting the threshold angle in response to driver input. The method further comprises adjusting the proportion of the driver demand wheel torque provided via the second propulsion source in response to a composition of a surface traveled across by a vehicle. The method includes where the surface traveled across by the vehicle is input to a human/machine interface.

In some examples, the method includes where the vehicle slip angle is estimated via one or more accelerometers. The method further comprises adjusting the proportion of the driver demand wheel torque provided via the second propulsion source in response to a steering angle being less than a threshold angle. The method further comprises adjusting the proportion of the driver demand wheel torque provided via the second propulsion source from the base proportion when the steering angle is less than the threshold angle or adjusting a proportion of the driver demand wheel torque provided via the first propulsion source when the steering angle is less than the threshold angle to maintain a speed of a wheel of the front axle to equal a speed of a wheel of the rear axle.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle powertrain, comprising:
    operating a first propulsion source providing propulsive effort to a front axle in a torque control mode;
    operating a second propulsion source providing propulsive effort to a rear axle in a torque control mode, the second propulsion source different than the first propulsion source; and
    increasing a proportion of a driver demand wheel torque provided via the second propulsion source from a base proportion and simultaneously decreasing the proportion of driver demand wheel torque provided via the first propulsion source in response to a steering angle being greater than a threshold angle.

2. The method of claim 1, further comprising decreasing the proportion of the driver demand wheel torque provided via the second propulsion source and increasing the proportion of driver demand wheel torque provided via the first propulsion source in response to the steering angle being less than the threshold angle.

3. The method of claim 1, further comprising adjusting the proportion of the driver demand wheel torque provided via the second propulsion source as a function of the steering angle.

4. The method of claim 3, where adjusting the proportion of the driver demand wheel torque provided via the second propulsion source as the function of the steering angle includes increasing the proportion of the driver demand wheel torque provided to the second propulsion source as an exponential function of the steering angle.

5. The method of claim 3, where adjusting the proportion of the driver demand wheel torque provided via the second propulsion source as the function of the steering angle includes increasing the proportion of the driver demand wheel torque provided to the second propulsion source as a linear function of the steering angle.

6. The method of claim 1, where the first propulsion source and the second propulsion source are electric machines.

7. The method of claim 1, where the first propulsion source or the second propulsion source is an electric machine, and where the other of the first propulsion source or the second propulsion source is an internal combustion engine.

8. A method for operating a vehicle powertrain, comprising:
    operating a first propulsion source providing propulsive effort to a front axle in a torque control mode;
    operating a second propulsion source providing propulsive effort to a rear axle in a torque control mode, the second propulsion source different than the first propulsion source;
    increasing a proportion of a driver demand wheel torque provided via the second propulsion source from a base proportion in response to a request to enter a sand powertrain mode and simultaneously decreasing the proportion of the driver demand wheel torque provided via the second propulsion source in response to a vehicle slip angle exceeding a threshold angle.

9. The method of claim 8, further comprising adjusting the threshold angle in response to driver input.

10. The method of claim 8, further comprising adjusting the proportion of the driver demand wheel torque provided via the second propulsion source in response to a composition of a surface traveled across by a vehicle.

11. The method of claim 10, where the surface traveled across by the vehicle is input to a human/machine interface.

12. The method of claim 8, where the vehicle slip angle is estimated via one or more accelerometers.

13. The method of claim 8, further comprising adjusting the proportion of the driver demand wheel torque provided via the second propulsion source in response to a steering angle being less than a threshold angle.

14. The method of claim 13, further comprising adjusting the proportion of the driver demand wheel torque provided via the second propulsion source from the base proportion when the steering angle is less than the threshold angle or adjusting a proportion of the driver demand wheel torque provided via the first propulsion source when the steering angle is less than the threshold angle to maintain a speed of a wheel of the front axle to equal a speed of a wheel of the rear axle.

15. A vehicle system, comprising:
    a first electric machine coupled to a wheel of a first axle;
    a second electric machine coupled to a wheel of a second axle, wherein the second electric machine is different than the first electric machine, and wherein the second electric machine is decoupled from the first electric machine; and
    a controller including executable instructions that cause the controller to:
        simultaneously increase a proportion of a driver demand wheel torque provided via the second electric machine from a base proportion and decrease the proportion of driver demand wheel torque provided via the first electric machine in response to a steering angle being greater than a threshold angle.

16. The vehicle system of claim 15, further comprising additional instructions to increase torque supplied to the wheel of the first axle in response to decreasing vehicle speed.

17. The vehicle system of claim 16, further comprising additional instructions to increase torque supplied to the wheel of the second axle in response to increasing vehicle speed.

18. The vehicle system of claim 17, where the first axle is a front axle, and where the second axle is a rear axle.

19. The vehicle system of claim 15, further comprising increasing torque provided to the wheel of the second axle to induce slip of the wheel of the second axle while providing the driver demand wheel torque via the first electric machine and the second electric machine in response to a steering angle greater than a threshold angle.

20. The vehicle system of claim 15, further comprising additional instructions to equalize a speed of the wheel of the second axle and a speed of the wheel of the first axle in response to a steering angle being less than a threshold angle.

* * * * *